United States Patent [19]
Yamauchi et al.

[11] Patent Number: 5,515,473
[45] Date of Patent: May 7, 1996

[54] AIRTIGHT SEAL STRUCTURE OF LOW MELTING POINT GLASS TO BE USED IN OPTICAL FIBER GUIDING PORTION OF OPTICAL DEVICE AND METHOD OF AIRTIGHT SEAL USING LOW MELTING POINT GLASS

[75] Inventors: Kenji Yamauchi, Tokyo; Masahiko Nakayama, Kanagawa, both of Japan

[73] Assignee: NEC Corporation, Japan

[21] Appl. No.: 188,160

[22] Filed: Jan. 28, 1994

[30] Foreign Application Priority Data

Jan. 29, 1993 [JP] Japan ................. 5-013395

[51] Int. Cl.⁶ .................................. G02B 6/255
[52] U.S. Cl. .................................. 385/138; 385/99
[58] Field of Search ............. 385/95, 99, 134–139

[56] References Cited

U.S. PATENT DOCUMENTS

| | | | |
|---|---|---|---|
| 4,826,276 | 5/1989 | Abbott et al. | 385/138 |
| 4,902,091 | 2/1990 | Althaus et al. | 385/138 |
| 4,904,046 | 2/1990 | Paschke et al. | 385/138 |
| 5,127,083 | 6/1992 | Ikeda et al. | 385/138 |

FOREIGN PATENT DOCUMENTS

| | | |
|---|---|---|
| 274222 | 7/1988 | European Pat. Off. . |
| 332046 | 9/1989 | European Pat. Off. . |
| 337141 | 10/1989 | European Pat. Off. . |
| 449591 | 10/1991 | European Pat. Off. . |
| 3741773 | 6/1989 | Germany . |
| 4118491 | 1/1992 | Germany . |
| 56-60404 | 5/1981 | Japan .................. 385/138 |
| 57-68937 | 4/1982 | Japan . |
| 5-241028 | 9/1993 | Japan . |
| 9114958 | 10/1991 | WIPO . |

OTHER PUBLICATIONS

"Solder Glass Sealed Windows and Fibers", by G. Kreutzmann et al., Schott Glaswerke, Landshut, Germany, 5 pp., No Date.

*Primary Examiner*—John D. Lee
*Attorney, Agent, or Firm*—Ostrolenk, Faber, Gerb & Soffen

[57] ABSTRACT

An airtight sealing method for a leading portion of an optical fiber, which provides high airtight sealing effect and is suitable for mass-production, is provided. The airtight seal structure of a leading portion of an optical fiber according to the present invention comprises an optical fiber and a metal pipe having a through-hole for receiving the optical fiber and adapted to connect an inner portion of the leading portion to an outer portion of the leading portion. A pair of glass pipes each having a through-hole receives the optical fiber and adapted to be inserted into the metal pipe. A low melting point glass material is disposed between the glass pipes in the metal pipe and seals the inner and outer portions of the leading portion by filling a space between an inside of the metal pipe and the optical fiber when heated. Particularly, the melting point of the glass pipes is higher than the melting point of the low melting point glass material so that they are sealed by the low melting point glass material and fixedly bonded to an inner wall of the metal pipe when the low melting point glass material becomes molten state by heating.

22 Claims, 3 Drawing Sheets

AIRTIGHT SEAL STRUCTURE OF LOW MELTING POINT GLASS TO BE USED IN OPTICAL FIBER GUIDING PORTION OF OPTICAL DEVICE AND METHOD OF AIRTIGHT SEAL USING LOW MELTING POINT GLASS

BACKGROUND OF THE INVENTION

The present invention relates to a method of forming an airtight seal structure to be used in an optical fiber guiding portion of an optical device having optical fibers.

In general, an optical device such as semiconductor optical module, $LiNbO_3$ optical waveguide device and light activated device, which is used in an optical fiber communication device, is encapsulated airtightly by a casing of such as anti-corrosive stainless steel, in order to prevent an optical semiconductor element or optical waveguide element from being influenced by moisture. Further, in order to completely sealing the whole casing externally, it is also necessary to airtightly seal an optical fiber guiding portion of the casing.

In order to completely protect the optical semiconductor element, etc., against external moisture, airtightness in the order of $10^{-8}$ atm.cc/sec is required. When the casing is composed of a metal case body and a metal cover thereof, airtightness in such order can be relatively easily achieved since the seam welding technique can be applied and airtight seal of electrode terminal portion is also easily achieved by fixing a lead portion thereof by glass.

For an optical fiber guiding portion thereof, airtight seal is difficult since the optical fiber is made of silicon oxide which is fragile and easily broken. Since the optical fiber has a protective sheath of resin, it is impossible to apply the seam welding directly. Therefore, it is customary to airtight seal such portion by fixing the sheath of the optical fiber with using adhesive resin (this will be referred as "first" method). With this first method, however, the airtightness obtainable is as low as on the order of $10^{-5}$ atm.cc/sec, which is not enough to obtain an acceptable reliability of the optical device.

As a second method for achieving high airtightness of the optical fiber guiding portion, Japanese Patent Application Laid-open No. Sho 57-68937 discloses a technique in which an optical fiber is covered by a metal material such as gold and the metal cover is soldered to a surrounding metal pipe. This technique makes it possible to obtain an airtight seal of substantially the same degree of the seam weld technique and, therefore, a high reliability of optical device can be obtained. In this case, however, the metal cover or coating of the optical fiber is indispensable and a vapor-deposition of such metal coating on an optical fiber is relatively complicated, leading to a high manufacturing cost.

As a third technique, a direct fixing of an optical fiber to a metal pipe by means of a low melting point glass has been proposed. It is known that the melting point of such low melting point glass is about 500° C. With such high temperature, an optical fiber may be subjected to microbending by which optical characteristics of optical fiber may be degraded.

As a fourth conventional technique, Japanese Patent Application Laid-open No. Hei 5-241028 discloses an optical fiber having a protective coating formed of ultraviolet setting resin. In this technique, when the optical fiber is heated, its optical characteristics is not degraded since there is no thermal stress in the optical fiber although the ultraviolet setting resin is burnt. Therefore, it is possible to airtightly seal the optical fiber without thermal stress. In this technique, however, there may be a case where the optical fiber is partially exposed at a portion on which the resin coating is burnt out.

SUMMARY OF THE INVENTION

An object of the present invention is to provide an airtight sealing method for a leading portion of an optical fiber, which includes relatively simple processing steps and provides high airtight sealing effect without adverse influence of melting heat of a low melting point glass.

Another object of the present invention is to provide an airtight sealing method for a leading portion of an optical fiber, by which partial exposition of optical fiber is prevented and any reinforcing step is unnecessary.

An airtight seal structure of a leading portion of an optical fiber according to the present invention comprises an optical fiber and a metal pipe having a through-hole for receiving the optical fiber and adapted to connect an inner portion of the leading portion to an outer portion of the leading portion. A pair of glass pipes each having a through-hole receives the optical fiber and is adapted to be inserted into the metal pipe. A low melting point glass material is disposed between the glass pipes in the metal pipe and seals the inner and outer portions of the leading portion by filling a space between an inside of the metal pipe and the optical fiber when heated.

Particularly, the melting point of the glass pipes is higher than the melting point of the low melting point glass material, so that they are sealed by the low melting point glass material and fixedly bonded to an inner wall of the metal pipe when the glass material becomes molten by heating.

The airtight seal structure of a leading portion of an optical fiber according to the present invention minimizes the length of a terminal end portion of the airtightly sealed optical fiber without any exposed portion of the optical fiber. The length of the metal pipe is as small as possible to retain the low melting point glass material. A portion of the optical fiber which is exposed is protected by the glass pipes. According to the method of the present invention, the glass pipes, whose melting point is higher than that of the low melting point glass material, are inserted into the through-hole of the metal pipe and the metal pipe is heated to melt the low melting point glass material. Therefore, there is no heat transmission to the protective coating by convection of air as in the conventional techniques. Further, flow of heat is prevented by the glass pipes, so that influence of heat to the protective coating is restricted to minimum.

The low melting point glass material in molten state functions to not only to fix the optical fiber to the metal pipe but also to fix the glass pipes to the metal pipe. A similar effect of blocking heat flow can be obtained by means of ceramic pipes instead of the glass pipes. However, in the latter case, it is impossible to fix the ceramic pipes to a metal pipe by low melting point glass material. Further, since the thermal conductivity of ceramic pipe is larger than that of glass pipe, the blocking effect of heat flow is not as large as that of the glass pipe. In addition thereto, by putting an exposed portion of the optical fiber within the glass pipes, it is possible to manufacture an airtightly sealed optical fiber which can be easily handled. Therefore, there is no need to protect the optical fiber by resin, etc., separately, and thus it is possible to supply airtightly sealed optical fiber terminals which can be easily handled. The glass pipes as they are can be used for positioning of the optical fiber, making any ceramic pipe unnecessary.

DETAILED DESCRIPTION OF THE PREFERRED EMBODIMENTS

Figure 1:
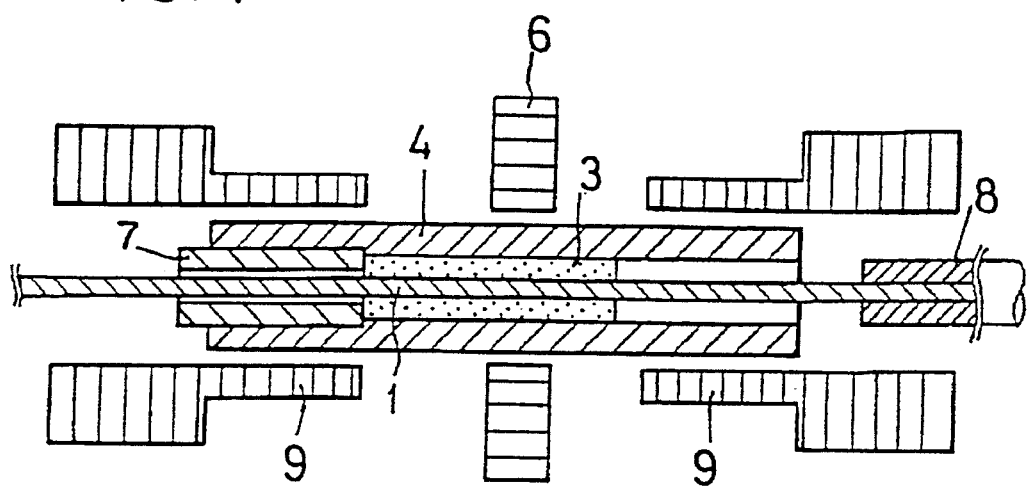
FIG. 1 is a longitudinal cross section of a conventional optical fiber leading portion, showing a conventional airtight seal therefor.

Among the conventional methods mentioned previously, the third and fourth methods will be described in detail. FIG. 1 shows an airtight seal portion provided by the third method, in which the optical fiber is directly fixed to the metal pipe by means of low melting point glass material. In this method, an optical fiber 1 is partially exposed by peeling off a portion of its protective coating 8 of such as nylon resin. Then, the exposed portion of the optical fiber 1 is inserted into a pipe shaped tablet 3 of low melting point glass material and the tablet 3 is inserted into a metal pipe 4. A ceramic pipe 7 having a positioning through-hole is pressure-inserted into an end portion of the metal pipe 4 in order to prevent the optical fiber 1 from leading within the metal pipe. In this state, the metal pipe 4 is heated by a high frequency induction heater 6 to heat the low melting point glass material 3 in the metal pipe 4 to a certain temperature which is high enough to melt the low melting point glass material. The thermal expansion coefficient of the metal pipe 4 is larger than that of the low melting point glass material 3 which is larger than that of the optical fiber 1. Therefore, when the heating terminates, the metal pipe 4 contracts to press the low melting point glass material 3 which contracts to press the optical fiber 1. The thermal expansion coefficient of the metal pipe 4 of SUS304 is $180\times10^{-7}$, that of the low melting point glass material 3 is approximately $50\times10^{-7}$ and that of the optical fiber 1 is $5\times10$. Due to the differences in thermal expansion coefficient between the metal pipe 4, the low melting point glass 3 and the optical fiber 1, a strong compressive force is produced with which the optical fiber 1, the low melting point glass material 3 and the metal pipe 4 can be completely intimately fixed to each other, resulting in an optical fiber terminal sealed airtightly enough to guarantee a high reliability of an optical device.

Figure 2:
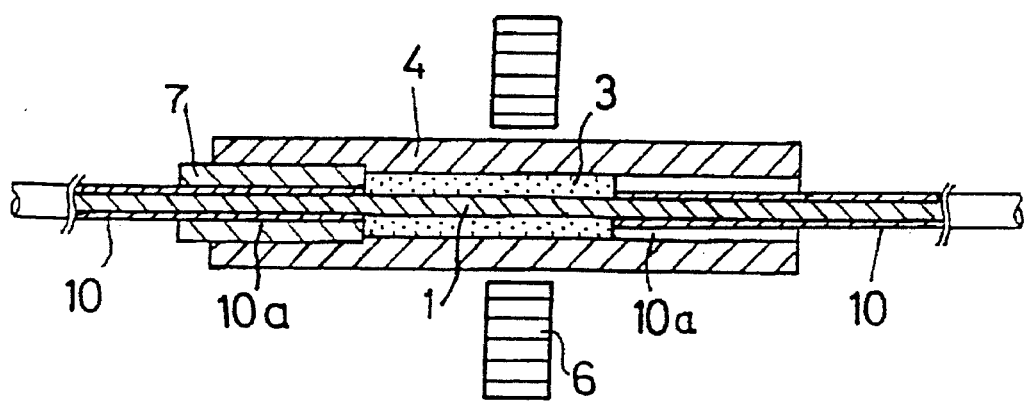
FIG. 2 is a longitudinal cross section of another conventional optical fiber leading portion, showing another conventional airtight seal therefor.

FIG. 2 shows an airtight seal portion provided by the fourth method, in which an optical fiber 1 has a protective coating 10 of ultraviolet setting resin which is hardened when irradiated with ultraviolet ray. In this method, when the optical fiber 1 is heated by a high frequency induction heater 6, only the protective coating 10 is burnt out and there is no thermal stress produced in the optical fiber 1. Therefore, the optical characteristics of the optical fiber 1 is not degraded. In the example shown in FIG. 2, the high frequency induction heater 6 is used to manufacture an airtightly sealed optical fiber terminal so that an exposed portion of the optical fiber 1 does not become unnecessarily long. That is, the length of the exposed portion of the optical fiber 1 is made equal to length of a pipe shaped tablet 3 of low melting point glass material so that the metal pipe 4 covers the ultraviolet setting resin coating 10 partially. The metal pipe 4 in such state is heated to melt the low melting point glass material 3. Heat is conducted to portions of the resin coating 10 which are covered by the metal pipe 4 from the metal pipe 4 through air or a ceramic pipe 7 pressure-inserted into one end of the metal pipe 4 and the portions of the resin coating 10 are not shrunk as the nylon resin coating 8 in FIG. 1 but burnt out. The burnt portions of the resin coating 10 is indicated by 10a. Therefore, it is possible to airtightly fix the optical fiber 1 to the metal pipe 4 by means of the low melting point glass material 3 without exerting thermal stress on the optical fiber 1. In this case, it should be noted, however, that the optical fiber 1 may be exposed at the burnt portions 10a.

In the third method mentioned previously and shown in FIG. 1, the exposed portion of the optical fiber may be easily broken or damaged. Further, it is necessary to remove an influence of heat used to heat the metal pipe on the optical fiber.

On the other hand, in the fourth method mentioned above and shown in FIG. 2 in which the protective coating is burnt out by heating, portions of the protective coating outside the metal pipe may also be burnt out, so that portions of the optical fibers which correspond to the burnt out portions of the protective coating outside the metal pipe may be exposed. Therefore, the reliability of the optical fiber after fixed by the low melting point glass material becomes very low.

Now, the airtight seal method of the optical fiber lead portion according to the present invention which solves the above-mentioned problems of the conventional method will be described with reference to FIGS. 3 to 5.

Figure 3:
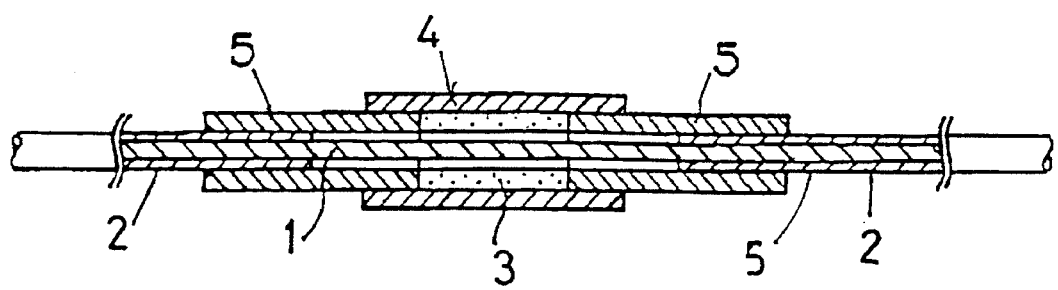
FIG. 3 is a longitudinal cross section of an optical fiber leading portion according to a first embodiment of the present invention before a low melting point glass is melted, showing an airtight seal therefor.
Figure 4:
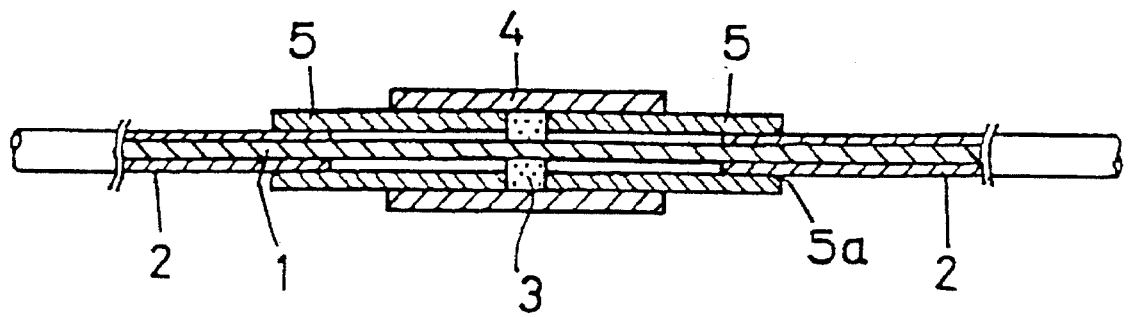
FIG. 4 is a longitudinal cross section of the optical fiber leading portion shown in FIG. 1 after the low melting point glass material is melted and fixed.
Figure 5:
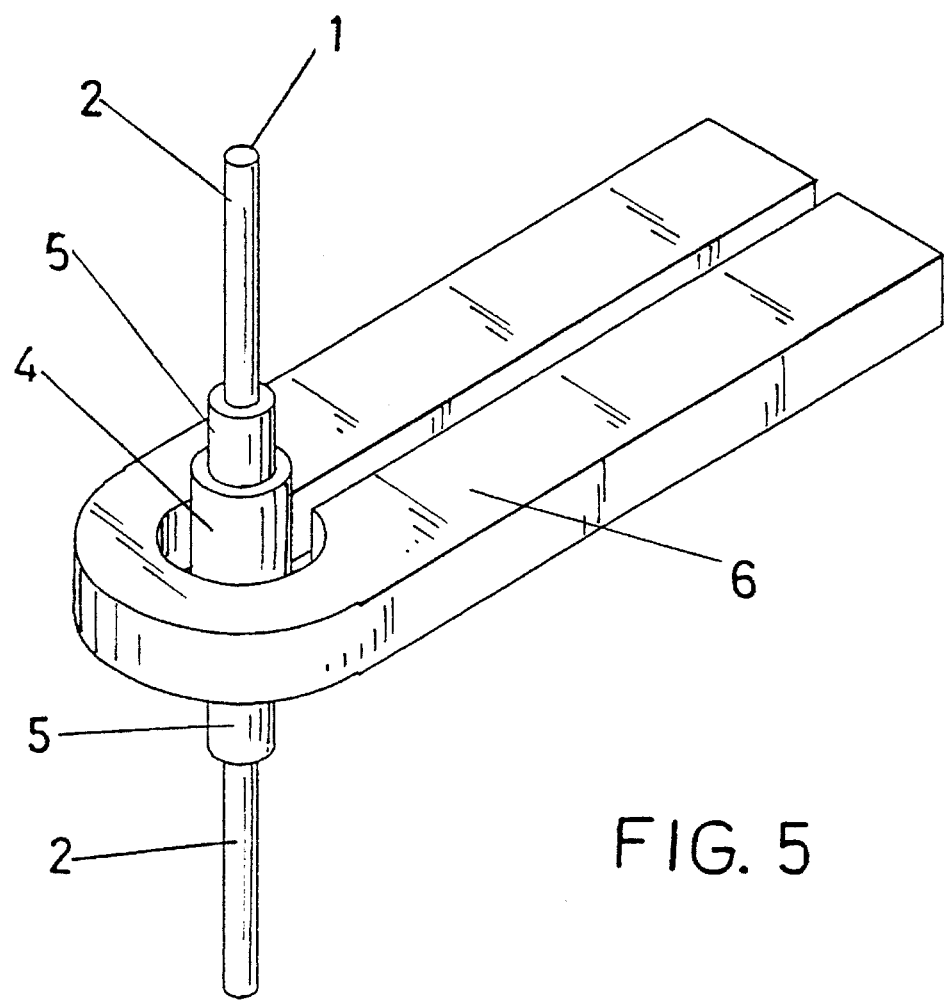
FIG. 5 is a perspective view of an optical fiber leading portion of the present invention, showing an airtight sealing of the portion by using a high frequency induction heater according to an embodiment of the present invention.

FIGS. 3 and 4 are longitudinal cross sections of the optical fiber lead portion before low melting point glass material is melted and after the low melting point glass material is melted and fixes the optical fiber in a metal pipe, respectively. First, as shown in FIG. 3, a portion of a protective coating 2 of an optical fiber 1, which may be of ultraviolet setting resin, is peeled off to expose the optical fiber 1. The optical fiber 1 is inserted into a glass pipe 5, a pipe shaped tablet 3 of low melting point glass and another glass pipe 5, in this sequence, such that the tablet 3 is positioned on the exposed portion of the optical fiber 1. Then, the assembly is inserted into a metal pipe 4 with the tablet 3 being at the center of the metal pipe 4 and with the glass pipes 5 being partially exposed from opposite ends of the metal pipe 4, respectively. The metal pipe 4 is then heated locally by a high frequency induction heater. FIG. 5 is a perspective view showing the local heating of the metal pipe 4. In FIG. 5, the metal pipe 4 of the assembly is put in the high frequency induction heater 6. When the metal pipe 4 is heated locally in this manner, the tablet 3 of low melting point glass material is melted and fixes the optical fiber 1 and the glass pipes 5 to the metal pipe 4.

Figure 6:
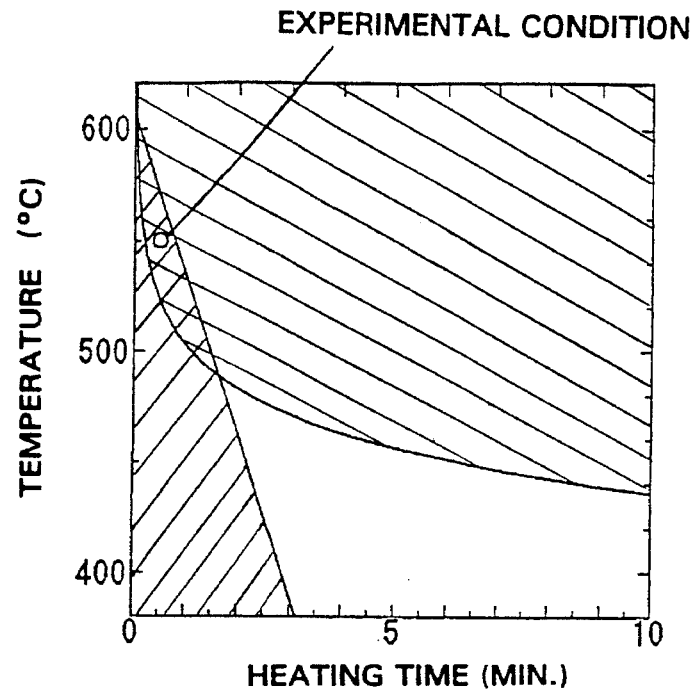
FIG. 6 is a graph showing a relation between heating condition and finished state of the airtightly sealed portion.

In this method, heating time and temperature are important parameters in heating low melting point glass material through the metal pipe and these parameters should be selected such that low melting point glass material is reliably melted while not affecting to the optical fiber. FIG. 6 shows the finish of the airtight seal portion as the heating condition is changed. In FIG. 6, the heating condition selected from a hatched area A is enough to reliably melt the low melting point glass and the heating condition selected from a hatched area B is enough to avoid influence of heat to the optical fiber. Therefore, the heating condition within a cross hatched area satisfies the requirement of the present method. The circle in the cross hatched area shows the heating condition used in this embodiment.

More specifically, the airtight seal portion is formed at a temperature of about 550° C. and a heating time of 30 seconds. At a temperature of 550° C., when the heating time is 20 seconds or shorter, low melting point glass is not melted sufficiently. On the other hand, when the heating time exceeds 60 seconds at the same temperature, the optical fiber 1 is influenced by heat. Therefore, at a temperature of 550° C., the heating time may be set between 20 seconds and 60 seconds.

When the airtight seal is prepared by heating the whole assembly in a heating furnace at 440° C., it takes 10 minutes. In the present embodiment in which low melting point glass is melted by local heating, the heating is performed at a higher temperature over and a shorter time than in the case of the heating furnace in to avoid of thermal influence to the optical fiber. The temperature of about 550° C., was selected because at 500° C., it takes about 3 minutes to melt low melting point glass 3 sufficiently, and, at 600° C. or higher, although low melting point glass is melted quickly, distortion of the optical fiber due to large differences in coefficient of linear coefficient between the respective constructive components during cooling becomes considerable and in either of the above-mentioned two cases, the thermal influence to the optical fiber becomes worse.

The tablet 3 of low melting point glass is formed by sintering and includes voids. Therefore, when melted, its apparent volume is reduced. According to the present method, the glass pipes 5 arranged in the opposite end portions of the metal pipe 4 are pushed in, respectively, when the tablet 3 is melted, so that any void in the molten low melting point glass is prevented from forming inside the metal pipe 4 and hence the intimate contacts between the metal pipe 4 and the low melting point glass tablet 3 and between the tablet 3 and the optical fiber 1 are obtained, making the airtight seal of the optical fiber lead portion more reliable.

The step of pushing the glass pipes 5 into the metal pipe 4 in order to at least reduce void formation in the molten low melting point glass 3 results in several favorable effects. That is, when the optical fiber is a polarization maintaining fiber, degradation of polarization due to uneven stress on a side surface of the optical fiber is avoided. Further, breakage of the optical fiber due to uneven stress is avoided. In addition, since there is no probable leakage of air through void portions, the reliability of airtightness is improved.

FIG. 4 is a longitudinal cross section of the optical fiber lead portion which is airtightly sealed as described above.

Since, in this embodiment, there is the glass pipes 5 are between the metal pipe 4 and the protective coating 2 of the optical fiber 1, heat generated in the metal pipe 4 is blocked by the glass pipes 5 to from being transmitted to the protective coating 2. To more reliably block heat transmission from the metal pipe 4 to portions of the protective coating 2 within the glass pipes 5 outside the metal pipe 4, a cooling mechanism is provided around the portions of the glass pipes 5. Further, since the glass pipes 5 cover the portions of the protective coating 2 sufficiently, it is possible to complete the melting step of low melting point glass without exposing the optical fiber 1. It should be noted that the glass pipes 5 have a positioning function of fixing the optical fiber 1 at a center of the through-hole of the metal pipe 4. Therefore, the optical fiber 1 is fixed in substantially the center position of the metal pipe 4 even when the low melting point glass material 3 is melted.

In this embodiment, the diameter of the metal pipe 4 is 2×10 mm (inner diameter is 1 mm) and diameter of the glass pipe 5 is 1×5.5 mm (inner diameter is 0.3 mm). The length of the portions of the glass pipe 5 which protrude from the opposite ends of the metal pipe 4 are 1 mm, respectively. The length of the exposed portion of the optical fiber 1 measured from each end of the metal pipe 4 is 0.5 mm and therefore the exposed portion is completely protected by the glass pipes.

Further, since protection of the optical fiber 1 having the protective coating against bending thereof can be improved by providing chamber 5a on the opening portion of the glass pipe 5, there for no need of additional machining thereof. Such chamfering of the glass pipe 5 can be achieved by coating the outside surface of the glass pipe 5 with a resist and etching it by dipping the glass pipe in a solution of such as hydrofluoric acid. In this embodiment, the glass pipe 5 is made of borosilicate glass having melting point higher than that of the low melting point glass 3. The physical properties of the low melting point glass and the glass pips 5 are shown in Table 1.

TABLE 1

| material | item | properties |
| --- | --- | --- |
| low melting glass | sealingly fixing temperature | 430° C. |
|  | coefficient of linear expansion | $41 \times 10^{-7}$/°C. |
| glass pipe | softening point | 720° C. |
|  | coefficient of linear expansion | $46 \times 10^{-7}$/°C. |
|  | heat conductivity | 0.0269 cal/cm · sec. °C. |

Figure 7:
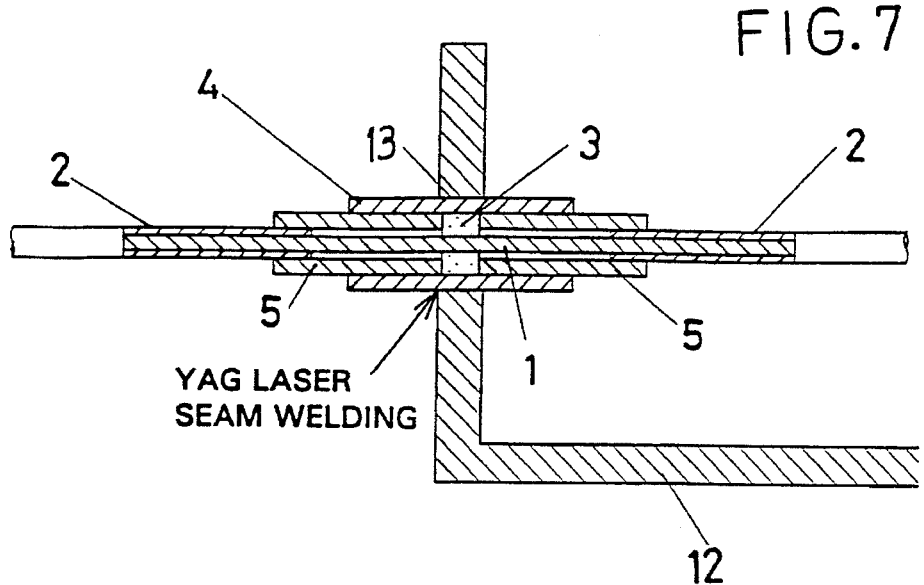
FIG. 7 is a longitudinal cross section of an optical fiber whose airtight seal portion is fixed to a casing by the manufacturing method of the optical fiber leading portion according to the present invention.

The metal pipe 4 in this embodiment is made of SUS304 or KOVAR. The metal pipe 4 made of SUS304 is suitable when the metal pipe 4 in which the optical fiber 1 is fixed by the low melting point glass is to be welded to a casing by using a YAG laser. FIG. 7 is a longitudinal cross section of an airtight seal structure of the optical fiber according to the present invention which is realized by inserting the airtight seal portion of the optical fiber prepared as mentioned above into a hole 13 formed in a side surface of the casing 12 and then seam-welding the metal pipe 4 thereof to the casing 12. In this embodiment, the metal pipe 4 may be substituted by a ceramic pipe, in which case, the fixing and airtight seal to the casing 12 can be done by soldering.

On the other hand, KOVAR is superior for the metal pipe 4 in that, since its coefficient of linear expansion is close to that of glass, it can reduce stress to the optical fiber. For this reason, the metal pipe 4 made of KOVAR is effective when the optical fiber is a polarization maintaining fiber which is easily influenced by stress. This is because the coefficient of linear expansion of the metal pipe is closely related to the amount of compressive force exerted on the optical fiber. Therefore, the use of KOVAR, whose coefficient of linear expansion is small reduces compressive stress to the optical fiber. Thus, the material of the metal pipe 4 is preferably either SUS304 or KOVAR. However, the metal pipe 4 may be made of any other material so long as the latter can provide a good contact with the glass material. Although, in this embodiment, a pair of glass pipes is used, it is possible to use a single glass pipe for airtight seal.

Figure 8:
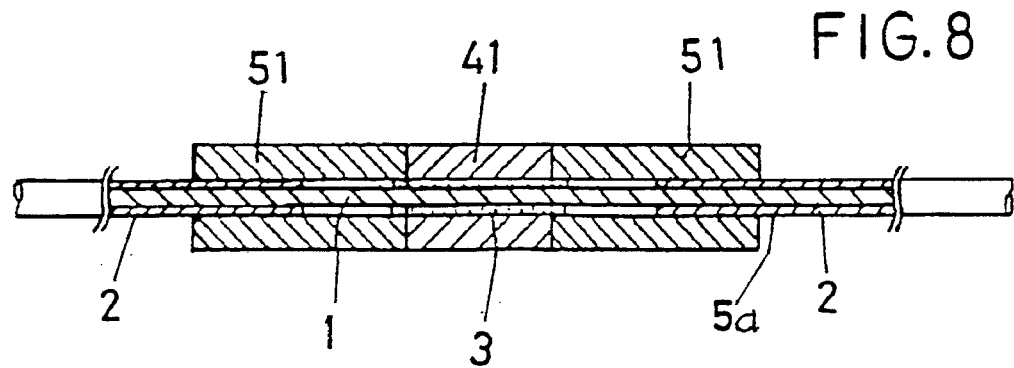
FIG. 8 is a longitudinal cross section of an optical fiber leading portion, showing an airtight sealing method according to a second embodiment of the present invention.

A second embodiment of the present invention will now be described with reference to FIG. 8. The second embodiment is featured by a glass pipe 51 having opposite ends which are made in contact with ends of a pair of metal pipes 41, respectively.

Although, in the previously described first embodiment, the metal pipe 4 must be long enough to receive the portions of the glass pipes 5 inserted into the metal pipe, the length of the metal pipe 41 in the second embodiment can be as short as necessary for an airtight seal by means of low melting point glass material 3 since glass pipes 51 are fixed to the metal pipe 41 with their end faces being in direct contact with respective opposite ends of the metal pipe 41. Further, the diameter of the metal pipe 41 can be reduced up to diameter of the glass pipe 51. Therefore, leakage of heat during heating of the metal pipe 41 is reduced and hence it is possible to melt the low melting point glass material 3 efficiently. As a result, it becomes possible to minimize an amount of heat given to the metal and thus thermal influence to a protective coating 2 can be minimized. The fixing between the metal pipe 41 and the glass pipes 51 is performed by the low melting point glass 3 as in the first embodiment.

Further, in the second embodiment, it is possible to improve protection of an optical fiber in the lateral direction by chamfering the end portions of the glass pipes 51, making a terminal processing in a later step unnecessary.

In the airtight seal method for an optical fiber leading portion according to the second embodiment of the present invention, the assembly of the metal pipe and the glass pipes whose melting point is higher than that of the low melting point glass material has the through-hole for receiving protected portions and an exposed portion of the optical fiber, and the low melting point glass material fills an annular space between an inner wall of the metal pipe and the exposed portion of the optical fiber. Since both the airtight seal and the fixing of the glass pipes to the metal pipe are performed by heating the metal pipe having the opposite ends in contact with the respective ends of the glass pipes to melt the low melting point glass material in the space, it is possible to prevent large heat transmission the metal pipe to the optical fiber and the protective coating thereof, so that the optical fiber can be airtightly sealed without degradation of its optical characteristics.

Further, since it is possible to reliably position the optical fiber precisely, the resultant optical fiber leading portion is stable. Further, due to the merit of simultaneous fixing of the low melting point glass and the glass pipes, any protective step for protecting the exposed optical fiber becomes unnecessary, simplifying the manufacture thereof. As a result, the workability during manufacture is improved and therefore an inexpensive and mass-producible optical fiber leading portion can be obtained.

Further, since length of the metal pipe can be very short, the heat for melting the low melting point glass within the space mentioned above can be used efficiently without unnecessary external heat radiation. Therefore, damage of the protective coating of the optical fiber can be minimized and hence its length required for the leading portion can be minimized without sacrificing its function of protecting the optical fiber. Thus, it is possible to miniaturize the whole structure.

Since the minimum length of the optical fiber leading portion necessary to achieve the airtight seal thereof is a sum of the length an for an airtight seal and the length necessary to fix the glass pipes, it is possible to reduce the length of the metal pipe down to about 2 mm. Since reduction of length of the metal pipe leads to reduction of heat to be added to the metal pipe, it is possible to further reduce the thermal influence to the optical fiber and to reduce length of the exposed portion of the optical fiber.

These advantages are significant when compared with the conventional metal pipe, which is as long as 20 mm or more in order to reduce thermal influence to the optical fiber by separating a portion of the metal pipe to which heat is added from the optical fiber by as a large distance as possible.

In a case where ceramic pipes are used instead of the glass pipes in the second embodiment, although heat flow from the metal pipe due to air flow can be blocked, the thermal influence to the optical fiber becomes larger compared with the case of the glass pipes since heat conductivity of ceramics is 0.05 cal/cm.sec. ° C. which is higher than that of the glass pipe. Further, the use of glass pipes is preferable in view of bonding thereof to the metal pipe through the low melting point glass in fixing them to the metal pipe.

What is claimed is:

1. An airtight seal structure of an optical fiber leading portion of an optical device, comprising:

an optical fiber having a length covered substantially by thermally sensitive protective layer;

a pipe member having a through-hole for receiving said optical fiber inserted thereinto, for connecting an interior of said optical fiber leading portion to an exterior of said optical fiber leading portion;

at least one glass pipe having a through-hole for receiving said optical fiber inserted thereinto and inserted into said pipe member; and a low melting point glass material disposed within said pipe member in the vicinity of an end face of said glass pipe and filling a space defined by an inner wall of said pipe member and said optical fiber when melted by heating to thereby airtightly seal said interior of said optical fiber leading portion against said exterior of said optical fiber leading portion within said pipe member;

wherein said pipe member is of a minimal length required for retaining said low melting point glass material, and wherein said thermally sensitive protective layer is removed from said optical fiber in the region of said heating to prevent said thermally sensitive protective layer from being damaged upon heating and melting of said low melting point glass material.

2. An airtight seal structure of an optical fiber leading portion of an optical device, claimed in claim 1, wherein the melting point of said glass pipe is higher than that of said low melting point glass material.

3. An airtight seal structure of an optical fiber leading portion of an optical device, claimed in claim 2, wherein an outer surface of said glass pipe is fixed to said inner wall of said pipe member by said low melting point glass material.

4. An airtight seal structure of an optical fiber leading portion of an optical device, claimed in claim 3, wherein said low melting point glass material is positioned in said interior of said leading portion with respect to said glass pipe.

5. An airtight seal structure of an optical fiber leading portion of an optical device, claimed in claim 3, wherein an end surface of said glass pipe is protruded from an end of said pipe member.

6. An airtight seal structure of an optical fiber leading portion of an optical device, claimed in claim 3, wherein a peripheral edge portion of said through-hole of said glass pipe is chamfered.

7. An airtight seal structure of an optical fiber leading portion of an optical device, claimed in claim 2, wherein said glass pipe is made of borosilicate glass.

8. An airtight seal structure of an optical fiber leading portion of an optical device, claimed in claim 2, wherein said optical fiber is a polarization maintaining fiber.

9. An airtight seal structure of an optical fiber leading portion of an optical device, claimed in claim 1, wherein said pipe member is of metal material.

10. An airtight seal structure of an optical fiber leading portion of an optical device, claimed in claim 1, wherein said pipe member is of ceramics.

11. An airtight seal structure of an optical fiber leading portion of an optical device, comprising:

an optical fiber;

a pipe member having a through-hole for receiving said optical fiber inserted thereinto, for connecting an interior of said optical fiber leading portion to an exterior of said optical fiber leading portion;

at least one glass pipe having a through-hole for receiving said optical fiber inserted thereinto and an outer diameter larger than an inner diameter of said pipe member, said glass pipe being in contact with at least an end face of said pipe member; and a low melting point glass material disposed within an annular space defined by an inner wall of said pipe member and said optical fiber and filling said space when melted by heating to thereby airtightly seal said interior of said optical fiber leading portion against said exterior of said optical fiber leading portion within said pipe member.

12. An airtight seal structure of an optical fiber leading portion of an optical device, claimed in claim 11, wherein said glass pipe has an outer diameter larger than a diameter of said through-hole of said pipe member and an end face in face to face contact with an end face of said pipe member.

13. An airtight seal structure of an optical fiber leading portion of an optical device, comprising:

an optical fiber having a thermally sensitive protective layer thereon;

a pipe member having a through-hole for receiving said optical fiber inserted thereinto, for connecting an interior of said optical fiber leading portion to an exterior of said optical fiber leading portion;

two glass pipes, each having a through-hole for receiving said optical fiber inserted thereinto and inserted into said pipe member; and a low melting point glass material disposed within said pipe member between said two glass pipes and filling a space defined by an inner wall of said pipe member and said optical fiber when melted by heating to thereby airtightly seal said interior of said optical fiber leading portion within said pipe member;

wherein said two glass pipes each abut one end of said space defined by said low melting point glass material, so that, upon heating and melting of said low melting point glass material, said two glass pipes may be pushed toward each other to expel any gas that may be formed and to urge molten low melting point glass into intimate contact with neighboring parts to form said airtight seal structure; and wherein said pipe member is of a minimal length required for retaining said low melting point glass material, and wherein said thermally sensitive protective layer is removed from said optical fiber in the region of said heating to prevent said thermally sensitive protective layer from being damaged upon heating and melting of said low melting point glass material.

14. An airtight seal structure of an optical fiber leading portion of an optical device, claimed in claim 13, wherein said optical fiber is coated with a protective coating and wherein a portion of said protective coating is removed in the vicinity of said optical fiber to which said low melting point glass material is bonded.

15. An airtight seal structure of an optical fiber leading portion of an optical device, comprising:

an optical fiber having a thermally sensitive protective layer thereon;

a metal pipe member having a through-hole for receiving said optical fiber inserted thereinto, for connecting an interior of said optical fiber leading portion to an exterior of said optical fiber leading portion;

at least one glass pipe having a through-hole for receiving said optical fiber inserted thereinto and inserted into said metal pipe member;

a low melting point glass material disposed within said metal pipe member in the vicinity of an end face of said glass pipe and filling a space defined by an inner wall of said metal pipe member and said optical fiber when melted by heating to thereby airtightly seal said interior of said optical fiber leading portion against said exterior of said optical fiber leading portion within said metal pipe member; and a casing having a hole on a surface thereof for receiving said metal pipe member, said hole having a diameter slightly larger than the outer diameter of said metal pipe member to facilitate subsequent attachment of said pipe member to said casing by welding;

wherein said metal pipe member is of a minimal length required for retaining said low melting point glass material, and wherein said thermally sensitive protective layer is removed from said optical fiber in the region of said heating to prevent said thermally sensitive protective layer from being damaged upon heating and melting of said low melting point glass material.

16. A method of airtightly sealing an optical fiber leading portion of an optical device, comprising the steps of:

inserting an optical fiber having a length covered substantially by a thermally sensitive protective layer into a first glass pipe and inserting said first glass pipe into a pipe member;

mounting a tablet of low melting point glass material on said optical fiber in said pipe member;

fitting a second glass pipe on said optical fiber from the side thereof on which said tablet is mounted and inserting said second glass pipe into said pipe member;

heating an outer periphery of said pipe member to melt said tablet of low melting point glass material;

exerting inward pressure to outer end faces of said first and second glass pipes; and cooling said pipe member;

wherein said pipe member is of a minimal length required for retaining said low melting point glass material, and wherein said thermally sensitive protective layer is removed from said optical fiber in the region of said heating to prevent said thermally sensitive protective layer from being damaged upon heating and melting of said low melting point glass material.

17. A method of airtightly sealing an optical fiber leading portion of an optical device, claimed in claim 16, further comprising, after the cooling step, the steps of inserting said pipe mender into a hole formed in a side surface of a casing and having a diameter slightly larger than an outer diameter of said pipe member and fixing a portion of said casing around said hole to an outer periphery of said pipe member by welding.

18. A method of airtightly sealing an optical fiber leading portion of an optical device, claimed in claim 16; wherein said optical fiber has a protective coating, further comprising, before the step of inserting said optical fiber into said pipe member, the step of removing a portion of said protective coating of said optical fiber to which said low melting point glass material is bonded.

19. A method of airtightly sealing an optical fiber leading portion of an optical device, claimed in claim 16, wherein the melting points of both of said first and second glass pipes is higher than that of said low melting point glass material.

20. A method of airtightly sealing an optical fiber leading portion of an optical device, claimed in claim 16, wherein, in the step of heating said pipe member, the temperature of said pipe member is in a range from 500° C. to 560° C. and heating time is in a range from 20 seconds to 90 seconds.

21. A method of airtightly sealing an optical fiber leading portion of an optical device, claimed in claim 16, wherein the temperature of said pipe member by heating thereof is in a range from 540° C. to 600° C. and heating time is in a range from 20 seconds to 60 seconds.

22. A method of airtightly sealing an optical fiber leading portion of an optical device, claimed in claim 16, wherein said heating of said pipe member is performed by a high frequency induction heater arranged around of said pipe member.

* * * * *